(12) United States Patent
Grgich et al.

(10) Patent No.: US 10,578,747 B2
(45) Date of Patent: Mar. 3, 2020

(54) SYSTEMS AND METHODS FOR REDUCED-OUTLIER SATELLITE POSITIONING

(71) Applicant: Swift Navigation, Inc., San Francisco, CA (US)

(72) Inventors: Paul Grgich, Hermosa Beach, CA (US); Matt Peddie, Brisbane (AU)

(73) Assignee: Swift Navigation, Inc., San Francisco, CA (US)

( * ) Notice: Subject to any disclaimer, the term of this patent is extended or adjusted under 35 U.S.C. 154(b) by 0 days.

(21) Appl. No.: 16/219,119

(22) Filed: Dec. 13, 2018

(65) Prior Publication Data

US 2019/0187298 A1 Jun. 20, 2019

Related U.S. Application Data

(60) Provisional application No. 62/598,826, filed on Dec. 14, 2017.

(51) Int. Cl.
*G01S 19/40* (2010.01)
*G06F 17/18* (2006.01)
*G01S 19/20* (2010.01)
*G01S 19/42* (2010.01)

(52) U.S. Cl.
CPC .............. *G01S 19/40* (2013.01); *G01S 19/20* (2013.01); *G01S 19/42* (2013.01); *G06F 17/18* (2013.01)

(58) Field of Classification Search
CPC .......... G01S 19/20; G01S 19/28; G01S 19/40; G01S 19/42; G01S 10/20; G01S 5/0278
See application file for complete search history.

(56) References Cited

U.S. PATENT DOCUMENTS

| | | | | |
|---|---|---|---|---|
| 6,691,066 B1* | 2/2004 | Brodie | ..................... | G01S 5/021 342/357.31 |
| 6,864,836 B1* | 3/2005 | Hatch | ..................... | G01S 19/20 342/357.58 |
| 7,219,013 B1* | 5/2007 | Young | ................... | G01C 21/165 342/357.58 |
| 7,696,922 B2* | 4/2010 | Nicholson | ............... | G01S 19/20 342/357.58 |
| 8,193,976 B2* | 6/2012 | Shen | ....................... | G01S 19/42 342/357.23 |
| 8,610,624 B2* | 12/2013 | Savoy | ..................... | G01S 19/20 342/357.58 |
| 9,069,073 B2* | 6/2015 | Ramakrishnan | ...... | G01S 19/426 |
| 2016/0195617 A1* | 7/2016 | Phatak | .................... | G01S 19/20 342/357.58 |

* cited by examiner

*Primary Examiner* — Gregory C. Issing
(74) *Attorney, Agent, or Firm* — Jeffrey Schox; Diana Lin

(57) ABSTRACT

A method for reduced-outlier satellite positioning includes receiving a set of satellite positioning observations at a receiver; generating a first receiver position estimate; generating a set of posterior observation residual values from the set of satellite positioning observations and the first receiver position estimate; based on the set of posterior observation residual values, identifying a subset of the satellite positioning observations as statistical outliers; and after mitigating an effect of the statistical outliers, generating a second receiver position estimate having higher accuracy than the first receiver position estimate.

5 Claims, 3 Drawing Sheets

---

Receiving a set of satellite positioning observations at the GNSS receiver S210

Generating a first receiver position estimate from the set of satellite positioning observations S220

Generating a set of posterior observation residual values from the set of satellite positioning observations and the first receiver position estimate Based on the set of posterior observation residual values, identifying a subset of the satellite positioning observations as statistical outliers using one of a scaled residual technique, a variance threshold technique, and a hybrid technique Generating a set of posterior observation residual covariances from the set of posterior observation residual values Calculating a set of posterior observation residual variances from the set of posterior observation residual covariances Detecting outliers using the variance threshold technique if a number of posterior observation residual variances outside of a threshold range is greater than a threshold number and using a scaled residual technique if the number of posterior observation residual variances outside of the threshold range is less than or equal to the threshold number.

After mitigating an effect of the statistical outliers, generating a second receiver position estimate having a higher accuracy than the first receiver position estimate

SYSTEMS AND METHODS FOR REDUCED-OUTLIER SATELLITE POSITIONING

CROSS-REFERENCE TO RELATED APPLICATIONS

This application claims the benefit of U.S. Provisional Application Ser. No. 62/598,826, filed on 14 Dec. 2017, which is incorporated in its entirety by this reference.

TECHNICAL FIELD

This invention relates generally to the satellite positioning field, and more specifically to new and useful systems and methods for reduced-outlier satellite positioning.

BACKGROUND

Being able to perform high precision satellite positioning is important for a wide variety of applications. Unfortunately, current GPS solutions are often either inaccurate or require processor power beyond the capabilities of inexpensive hardware (either locally or in the cloud). A number of solutions have been proposed to address this problem, including Precise Point Positioning (PPP) and Real Time Kinematic (RTK) satellite positioning. However, all satellite positioning solutions are made less efficient by noise in receiver observations. Therefore, there is the need in the satellite positioning field to create systems and methods for reduced-outlier satellite positioning. This invention provides such new and useful systems and methods.

DESCRIPTION OF THE INVENTION EMBODIMENTS

Figure 1:
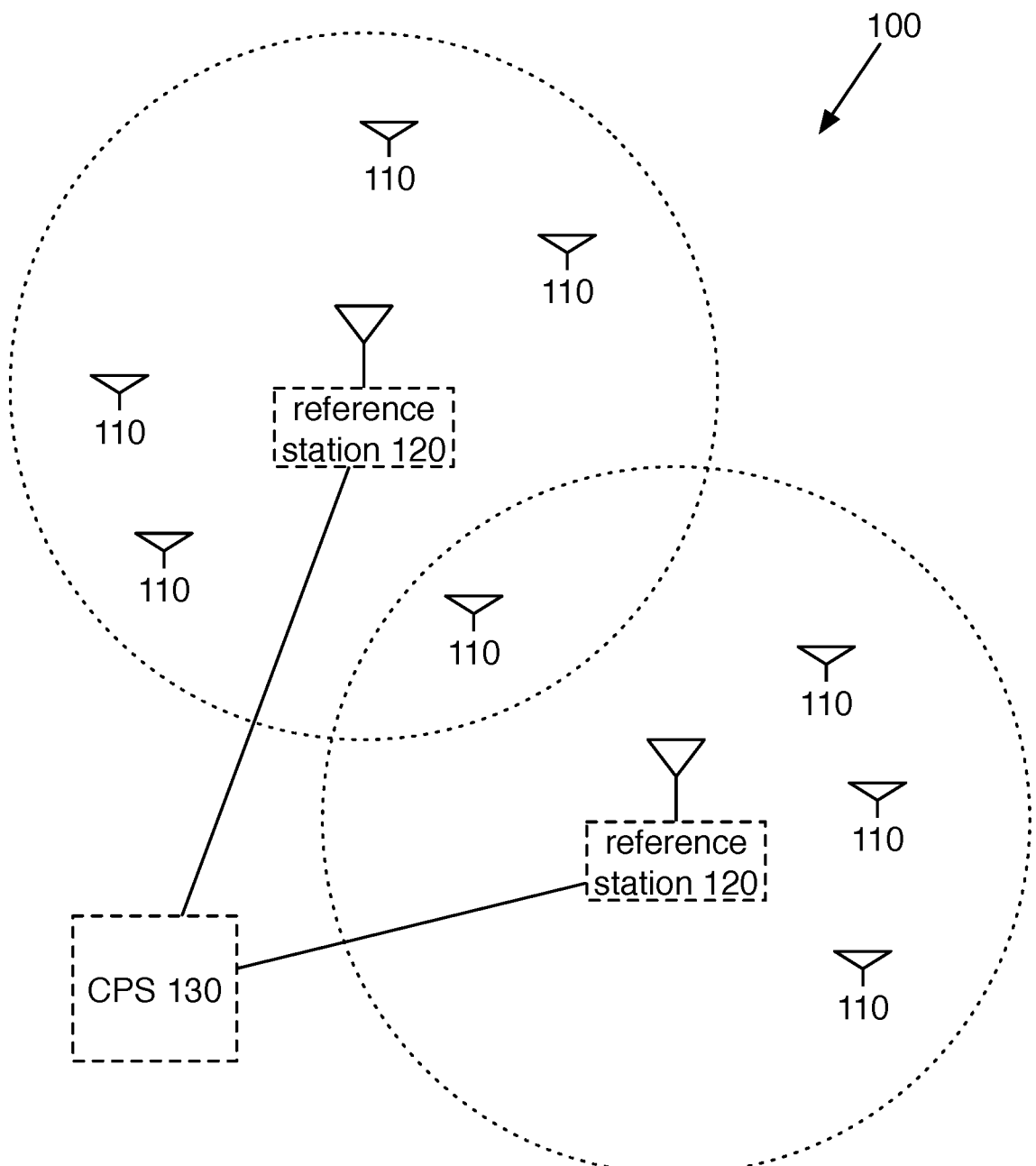
FIG. 1 is a diagram representation of a system of an invention embodiment.

The following description of the invention embodiments of the invention is not intended to limit the invention to these invention embodiments, but rather to enable any person skilled in the art to make and use this invention.

1. Traditional GNSS, PPP, and RTK

Traditional satellite positioning systems (e.g., standard GNSS) work by attempting to align a local copy (at a receiver) of a pseudorandom binary sequence with a satellite-transmitted copy of the same sequence; because the satellite is far from the receiver, the signal transmitted by the satellite is delayed. By delaying the local copy of the sequence to match up with the satellite-transmitted copy, the time it takes the signal to travel from the satellite to the receiver can be found, which can in turn be used to calculate the distance between the satellite and receiver. By performing this process for multiple satellites (typically four or more), a position of the receiver relative to the satellites can be found, which can in turn be used to find the position in a particular geographic coordinate system (e.g., latitude, longitude, and elevation). Typical GNSS systems can achieve at best 2 m accuracy in positioning.

For many applications (e.g., guidance for human-carrying autonomous vehicles/drones/agricultural equipment, GPS/GNSS research, surveying), this level of accuracy is woefully inadequate. In response, two position correction algorithms have been developed: precise point positioning (PPP) and real time kinematic (RTK).

Instead of solely using the pseudo-code broadcast by satellites, PPP and RTK also make use of satellite signal carrier phase to determine position. While much higher accuracy is possible using carrier phase data, accurately determining position of a mobile receiver (i.e., the receiver for which position is to be calculated) requires accounting for a number of potential sources of error. Further, carrier phase measurements are ambiguous; because the carrier signal is uniform, it may not be possible to differentiate between a phase shift of $\varphi$ and $2\pi N+\varphi$ using phase measurements alone, where N is an integer. For example, it may be difficult to determine the difference between a phase shift of $\pi$ radians and a phase shift of $3\pi$ radians (or $-\pi$, $5\pi$, etc.).

PPP attempts to solve this issue by explicitly modeling the error present in mobile receiver phase and code measurements. Some errors are global or nearly global (e.g., satellite orbit and clock errors); for these errors, PPP typically uses correction data with highly accurate measurements. However, for local errors (i.e., error that is substantially dependent on mobile receiver location), PPP is only capable of very rough modeling. Fortunately, many local errors change slowly in time; resultantly, PPP can achieve high accuracy with only a single receiver, but may require a long startup time to precisely determine local errors.

RTK avoids a large majority of the modeling present in PPP by use of GNSS reference stations (with precisely known locations); since a reference station is local to the mobile receiver, differencing the reference station and mobile receiver signals can result in greatly reduced error. The result is that RTK solutions can converge much more quickly than PPP solutions (and without the high accuracy global corrections data needed by PPP). However, RTK solutions require the presence of base stations near a mobile receiver.

For all three of these positioning solutions, the presence of corrupted or otherwise inaccurate observation data (either at a receiver or as an input for corrections generation) has the potential to reduce solution accuracy and efficiency (in particular, the presence of outlier data may increase convergence time for a given solution).

The systems and methods of the present disclosure are directed to the removal of inaccurate observation data in satellite positioning techniques, in turn increasing accuracy, efficiency, and/or any other metric of positioning performance (e.g., accuracy of corrections data).

2. Reduced-Outlier Satellite Positioning System

As shown in FIG. 1, a reduced-outlier satellite positioning system 100 includes a mobile receiver 110. The system 100 may additionally include reference stations 120 and/or a central processing server 130.

The system 100 functions to estimate the position of the mobile receiver 110 with high accuracy. The system 100 preferably functions to perform satellite positioning using a novel form of outlier mitigation (described in more detail in the section on the method 200). Mobile receivers 110 of the system 100 are preferably able to achieve centimeter-level relative positioning while maintaining a small form factor, low cost, and low power consumption. The advantages in accuracy, size, cost, and power consumption preferably enable mobile receivers 110 to be used in applications where previous GNSS solutions were not accurate enough, too large, too expensive, and/or too power hungry. Applications that may be of particular interest to purchasers of mobile receivers 110 include autonomous vehicle guidance (e.g., for UAVs or agricultural equipment), GPS/GNSS research, and surveying systems. Additionally, the mobile receivers 110 may be designed to utilize open-source firmware, allowing them to be easily customized to particular demands of end user applications, easing system integration and reducing host system overhead.

The mobile receiver 110 functions to calculate position data (e.g., pseudo-range, phase) that can be used to calculate the position of the mobile receiver 110.

Figure 2:
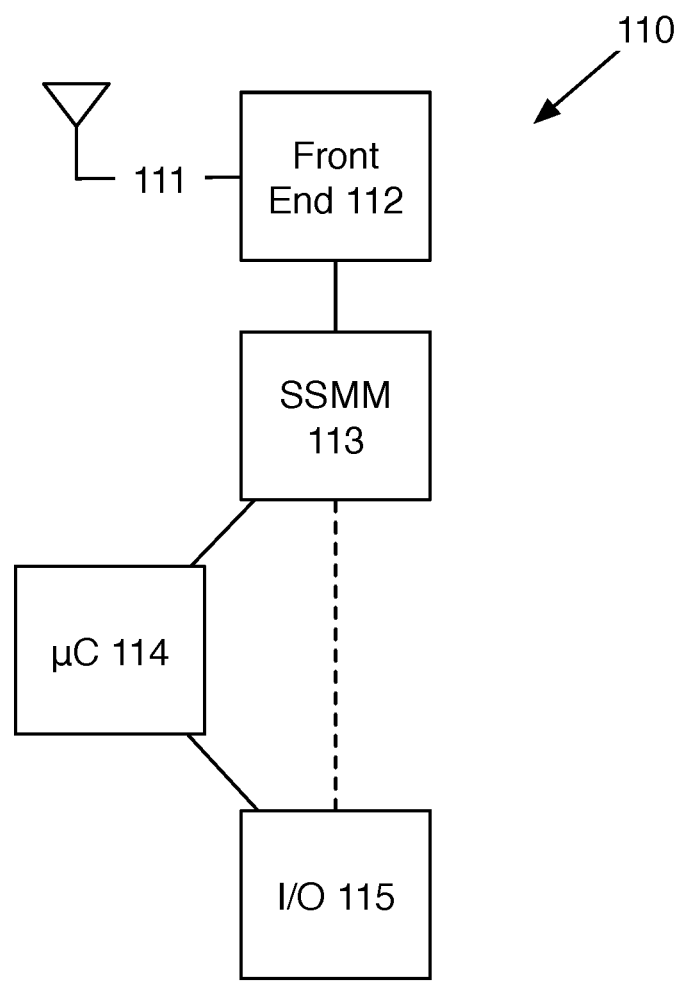
FIG. 2 is a diagram representation of a mobile receiver of a system of an invention embodiment.

As shown in FIG. 2, the mobile receiver 110 preferably includes an antenna coupler 111, a front-end module 112, a satellite signal management module 113, a microcontroller 114, and an input/output module 115.

The antenna coupler 111 functions to couple a satellite signal-ready antenna to the mobile receiver 110 (additionally or alternatively, the mobile receiver 110 may include an antenna, such as a patch antenna).

Antennas coupled by and/or included with the antenna coupler 111 are preferably made out of a conductive material (e.g., metal). The antennas may additionally or alternatively include dielectric materials to modify the properties of the antennas or to provide mechanical support.

The antennas may be of a variety of antenna types; for example, patch antennas (including rectangular and planar inverted F), reflector antennas, wire antennas (including dipole antennas), bow-tie antennas, aperture antennas, loop-inductor antennas, and fractal antennas. The antennas can additionally include one or more type of antennas, and the types of antennas can include any suitable variations. The antenna structure may be static or dynamic (e.g., a wire antenna that includes multiple sections that may be electrically connected or isolated depending on the state of the antenna). Antennas may have isotropic or anisotropic radiation patterns (i.e., the antennas may be directional). If antennas are directional, their radiation pattern may be dynamically alterable; for example, an antenna substantially emitting radiation in one direction may be rotated so as to change the direction of radiation.

If the antenna coupler 111 couples to multiple antennas, the antenna coupler 111 may split power between them using a splitter; additionally or alternatively, the antenna coupler 111 may include a switch to select between the multiple antennas, or the antenna coupler 111 may couple to the antennas in any suitable manner.

The front-end module 112 functions to convert signals received by the antenna coupler 111 to digital baseband signals for processing. The front-end module 112 includes an analog-to-digital converter (e.g., the Maxim MAX2769) capable of operating at high sample rates. The front-end module 112 is preferably capable of receiving L1 GPS, GLONASS, Galileo, and SBAS signal bands. The front-end module 112 may additionally or alternatively be capable of receiving additional bands (e.g., L2 GPS) or the mobile receiver 110 may include multiple front-end modules 112 for different bands.

The satellite signal management module 113 functions to perform satellite signal tracking and acquisition. The satellite signal management module 113 may additionally or alternatively include programmable digital notch filters for performing continuous wave noise nulling. The satellite signal management module preferably includes flexible and fully programmable correlators that may be used by the microcontroller 114 to implement tracking loops and acquisition algorithms. The satellite signal management module 113 is preferably implemented on an FPGA, allowing the firmware to be altered to enable adaptation of the mobile receiver 110 to various applications. Additionally or alternatively, the satellite signal management module 113 may be implemented by any suitable circuit.

The microcontroller 114 functions to perform signal processing above the correlator level on the mobile receiver 110 (e.g., tracking loop filters, acquisition management, navigation processing, etc.). The microcontroller 114 additionally or alternately manages communication over the input/output module 115. The microcontroller 114 preferably is able to calculate position, velocity, time (PVT) solutions at a rate of 50 Hz or higher, but may additionally or alternatively calculate PVT solutions at any rate.

The input/output module 115 functions to allow for data to be transmitted from or received by the mobile receiver 110. The input/output module 115 is preferably used to couple the mobile receiver 110 to a UHF radio modem, so that the mobile receiver 110 may receive reference station 120 correction signals over the UHF radio modem. The input/output module 115 may additionally or alternatively be used for any other suitable transmission or reception of data from the mobile receiver 110 (e.g., the mobile receiver 110 may transmit raw navigation data over the input/output module 115 to a control computer on a UAV, or the mobile receiver 110 may transmit data through a Bluetooth or cellular modem connected to the input/output module 115). The input/output module 115 preferably includes one or more UART connections, but may additionally or alternatively include connections for any other suitable input/output communications; for example, the input/output module 115 may include a USB port.

The reference stations 120 function to transmit phase data of signals received at the reference stations 120 (or other data useful for positioning correction). The reference stations 120 utilized by the system 100 are preferably public reference stations, but may additionally or alternatively be private reference stations or any other reference stations.

Reference stations 120 preferably have a location known to a high degree of accuracy. Reference station 120 location is preferably the location of the antenna used to receive satellite signals. Reference station 120 location may be determined in any manner yielding a high degree of accuracy; for example, reference station 120 location may be determined by a number of single frequency carrier phase receivers set around the reference station 120 at vertical and horizontal reference points. Note that while reference stations 120 are preferably fixed in location, they may additionally or alternatively be mobile. Station position is preferably re-determined to high accuracy before moved reference stations 120 re-start providing phase data; additionally or alternatively, reference stations 120 may provide phase data before location re-determination (for example, for use in attitude estimation). As another alternative, reference stations 120 may not provide absolute location data at all if not needed; for example, absolute location data of the reference station 120 may not be needed for applications including attitude estimation.

Reference stations 120 preferably provide phase data for multiple satellite signals and the location of the reference station via the internet, but may additionally or alternatively provide data by any other suitable method (e.g., transmission by UHF-band radio modem). Reference station 120 data is preferably made available directly to mobile receivers 120, but may additionally or alternatively be processed or aggregated before being made available to mobile receivers 120.

In one variation of a preferred embodiment, data from multiple reference stations 120 is combined at a server (e.g., the central processing server 130); the server uses the reference station 120 data to create a virtual reference station. Error in relative positioning of a mobile receiver 110 increases with the distance from the reference station 120. By comparing data from multiple reference stations 120, distance-dependent systematic errors (e.g., those caused by ionospheric and tropospheric refractions or satellite orbit errors) can be modeled more precisely. The server can then use these error models to predict the reference data that would be transmitted by a reference station near the mobile receiver 110; from this prediction, data from a 'virtual reference station' with a location near the mobile receiver 110 can be transmitted to the mobile receiver 110 and used to increase mobile receiver 110 positioning accuracy.

The central processing server 130 functions to process data from reference stations 120 and mobile receivers 110. The central processing server 130 may process this data for multiple purposes, including aggregating position data (e.g., tracking multiple mobile receivers 110), system control (e.g., providing flight directions to a UAV based on position data received from a mobile receiver 110 attached to the UAV), and/or position calculation (e.g., performing calculations for mobile receivers 110 that are offloaded due to limited memory or processing power). The central processing server 130 may additionally or alternatively process data to perform all or part of the outlier reduction steps of the method 200. The central processing server 130 may additionally or alternatively manage reference stations 120 or generate virtual reference stations for mobile receiver 110 based on reference station 120 data. The central processing server 130 may additionally or alternatively serve as an internet gateway to mobile receiver 110 data if mobile receivers 110 are not internet connected directly. The central processing server 130 is preferably an internet-connected general-purpose computer, but may additionally or alternatively comprise any suitable hardware.

3. Method

Figure 3:
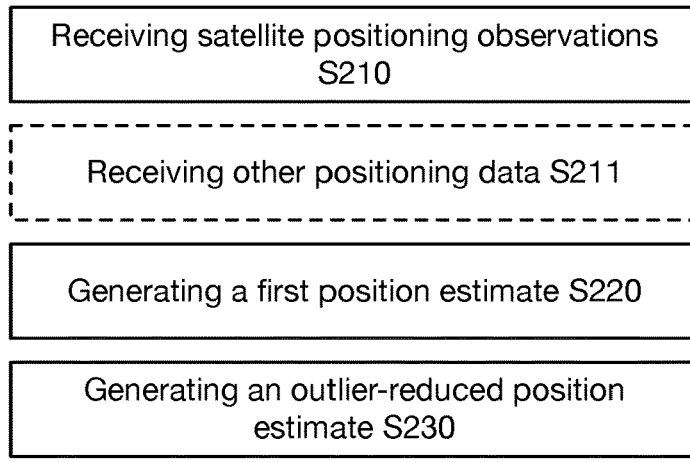
FIG. 3 is a chart representation of a method of an invention embodiment.
Figure 4:
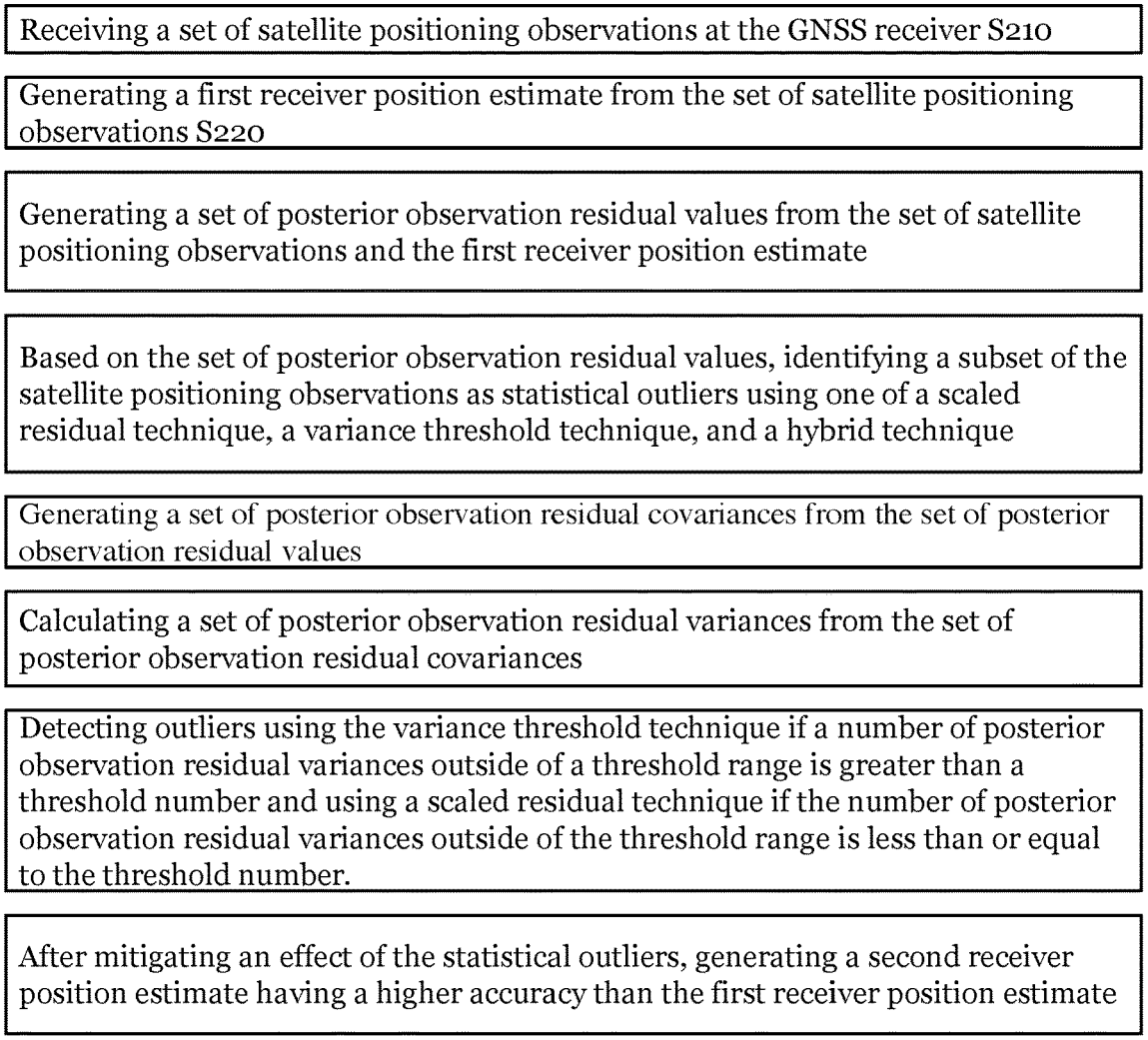
FIG. 4 is a chart representation of an embodiment of the invention using a hybrid technique to identify statistical outliers.

A method 200 for reduced-outlier satellite positioning includes receiving satellite positioning observations S210, generating a first receiver position estimate S220, and generating an outlier-reduced second receiver position estimate S230, as shown in FIG. 3. The method 200 may additionally or alternatively include receiving other positioning data S211.

The method 200 functions to utilize one of three techniques to detect erroneous observations in satellite positioning data (described in the section on S230) and remove the erroneous observations to improve positioning accuracy.

S210 includes receiving satellite positioning observations. S210 functions to receive (at a mobile receiver or at any other computer system) satellite data that can be used to calculate the position of the mobile receiver (potentially along with correction data). Satellite data preferably includes pseudo-range and phase observations at the mobile receiver, but may additionally or alternatively include any data useful for satellite positioning (e.g., positioning code data). The observations received in S210 may be of any number of satellites at any time(s). Pseudo-range and phase observations are preferably derived from navigation receiver carrier signals at the L1 frequency (1575.42 MHz), but may additionally or alternatively be received at the L2 frequency (1227.60 MHz) or any other suitable frequency. Navigation satellite carrier signals received in Step S210 may include GPS signals, GLONASS signals, Galileo signals, SBAS signals and/or any other suitable navigation signal transmitted by a satellite.

If receiver carrier signals are received at both L1 and L2 frequencies, Step S210 may include combining the L1 and L2 frequency signals for each satellite to create a beat signal. Alternatively, any other linear combination of signals from any frequency bands may be formed. The resulting signal (i.e., the beat signal) has a center frequency significantly lower than either the L1 or L2 signals (~347.82 MHz), which allows for a smaller set of possible integer ambiguity values for a given prior (e.g., if $|N| \leq 10$ for an L1 signal, $|N| \leq 2$ for the example beat signal). The resulting signal may additionally or alternatively possess other desirable properties (e.g., reduction in ionospheric error).

S210 is preferably performed initially at the mobile receiver, but S210 may additionally include transmitting data (e.g., phase, pseudo-range, receiver specific corrections data) from the mobile receiver to a remote computer (e.g., a computer at a reference station, a cloud computing server, another mobile receiver). Alternatively, S210 may be performed at any computer system.

S211 includes receiving other positioning data. S211 functions to receive additional data used for positioning in addition to satellite data. For example, S211 may include receiving inertial data from an inertial measurement unit (IMU), accelerometer, and/or gyroscope that may be useful in calculating receiver position more accurately. As a second example, S211 may include receiving data from a speedometer, odometer, or other position/speed/acceleration measuring source at the mobile receiver. As a third example, S211 may include receiving data concerning receiver position from an external source (e.g., an optical camera system tracking the mobile receiver or an object coupled to the mobile receiver).

Like S210, S211 is preferably performed initially at the mobile receiver (except in the case of externally sourced data), but S211 may additionally include transmitting data (e.g., phase, pseudo-range, receiver specific corrections data) from the mobile receiver to a remote computer (e.g., a computer at a reference station, a cloud computing server, another mobile receiver). Alternatively, S211 may be performed at any computer system.

S220 includes generating a first receiver position estimate. S220 functions to generate an estimate of the receiver position using the observations received in S210 (and potentially prior observations as well).

S220 preferably includes generating an estimate of the receiver position in absolute Cartesian coordinates, but may additionally or alternatively include generate the receiver position estimate using any coordinate system.

S220 preferably includes generating the first receiver position estimate using a Kalman filter (or another filter that estimates receiver state based on a time series of noisy measurements), but may additionally or alternatively include generating the first receiver position estimate in any manner. For sake of convenience, the mathematical expressions that follow are given with respect to a Kalman filter, but it is understood that the concepts embodied by these expressions may be adapted to other techniques for generating position estimates.

The observations received in S210 may be formatted for position estimate generation as follows:

$$z_k = H_k x_k + n_k$$

where $z_k$ is the measurement at time (or step) k, $x_k$ is the true state, $n_k$ is observation noise (zero mean and with known covariance), and $H_k$ is the observation model that maps the true state space into the observed space. The Kalman filter model further assumes that there is a relationship between states at different times given by $$x_k = F_k x_{k-1} + w_k$$

where $w_k$ is process noise (also zero mean and with known covariance) and $F_k$ is the transition model that maps true state at time k−1 to true state at time k.

The observation vector z preferably includes pseudo-range and phase measurements, related to range (i.e., distance between the receiver and a given satellite) as follows:

$$\rho = r + I + \epsilon_\rho$$
$$\phi = \frac{r}{\lambda} + \frac{I}{\lambda} + \epsilon_\phi$$

The state vector x preferably includes receiver position (e.g., x, y, z), and may additionally include other calculated estimates (e.g., phase ambiguity, ionospheric error terms, etc.).

The position estimate of S220 is preferably calculated by any number of prediction and update steps based on the observations received in S210. For example, S210 may include receiving observations at different times, and S220 may include generating a position estimate using all of those observations and a previous position estimate. Alternatively, S220 may include generating a position estimate from only a subset of the observations.

S230 includes generating an outlier-reduced second receiver position estimate. S230 functions to detect the effect of erroneous observations (i.e., erroneous observations detectable as statistical outliers) in the first receiver position estimate and modify the position estimate to increase accuracy (generating the second receiver position estimate, characterized by higher performance).

While techniques for removing or weighting measurement outliers exist in the prior art (as well as analysis of solution or measurement quality based on residuals), S230 includes specific techniques that may more efficiently mitigate the effect of outliers than existing techniques. For example, while techniques exist for mitigating for a single outlier at a time, the techniques of S230 may lend themselves to identifying and/or mitigating for multiple outliers in parallel.

S230 preferably detects outlier observations using one of the three following techniques (scaled residual technique, variance threshold technique, and hybrid technique). After detecting outlier observations, S230 preferably includes generating the second position estimate in the same manner as in S220, but excluding any outlier observations. Additionally or alternatively, S230 may include generating the second position estimate by adding new observations with negative variances as updates to the first position estimate (the new observations serving to remove the effects of detected outlier observations), or in any other manner. While these are two examples of how S230 may mitigate effects of outliers on position estimates, S230 may additionally or alternatively accomplish this in any manner (e.g., weighting non-outlier observations more strongly than outlier observations).

Scaled Residual Technique

In a first implementation of an invention embodiment, S230 includes generating an outlier-reduced second receiver position estimate using the scaled residual technique described in this section. Note that the term "scaled residual technique" is here coined to refer to exactly the technique described herein (any similarity in name to other techniques is purely coincidental).

In the scaled residual technique, S230 preferably includes calculating posterior residual values for the satellite data observations. That is, for observations $z_k$ and posterior state estimate $\hat{x}_{k|k}$ (calculated in S220), S230 preferably includes calculating the residual $$\tilde{v}_{k|k} = z_k - H_k \hat{x}_{k|k}$$

henceforth referred to as the posterior observation residual (sometimes referred to as the measurement post-fit residual). From the posterior observation residual, S230 preferably includes calculating the posterior observation residual covariance, $$C_k = R_k - H_k P_{k|k} H_k^T$$

where $R_k$ is the covariance of $n_k$ and $P_{k|k}$ is the updated state covariance.

From the posterior observation residual covariance, the variance of the posterior observation residual vector can be calculated:

$$\sigma^2 = \frac{v^T R_k^{-1} v}{DOF}$$

where DOF is degrees of freedom. Note that v may be written as Sz where S is an matrix having a trace equivalent to the DOF. From this, it can be said that $$S = I - H_k P_{k|k} H_k^T R_k^{-1}$$

Finally, this variance can be used to scale the residuals $\tilde{v}_{k|k}$ (e.g., by dividing residuals by their associated standard deviations or by their associated variances). The scaled residuals are then compared to a threshold window (e.g., one corresponding to plus or minus 3 standard deviations from the mean), and any observations falling outside the threshold window are flagged as outlier observations.

The second receiver position state is then generated from the reduced set of observations as described previously.

Variance Threshold Technique

In a second implementation of an invention embodiment, S230 includes generating an outlier-reduced second receiver position estimate using the variance threshold technique described in this section. Note that the term "variance threshold technique" is here coined to refer to exactly the technique described herein (any similarity in name to other techniques is purely coincidental).

In the variance threshold technique, the posterior residual, posterior residual covariance, and posterior residual variance are calculated as in the scaled residual technique. However, in this technique, the posterior residual variances are examined directly. If one or more posterior residual variances is outside of a threshold range, this is an indication that outliers may be present in the observation data.

In this technique, S230 preferably includes removing a set of observations and recalculating the posterior residual variances. If the posterior residual variances fall below threshold levels, the algorithm may stop here; however, the algorithm may alternatively try removing a different set of observations (and so on, until at least one or more of them falls below threshold levels). Alternatively stated, the algorithm may continue until the number of posterior residual variances outside of a threshold range is less than a threshold number.

Alternatively, in this technique, S230 may include calculating posterior residual variances for a number of set-reduced observations (i.e., different subsets of the whole set of observations) and choosing the reduced set with the lowest variance.

This technique may be particularly useful for differenced measurements. Differenced measurements are correlated, and thus more likely to result in an outlier in one observation corrupting residuals that correspond to different observations.

The second receiver position state is then generated from the reduced set of observations as described previously.

Hybrid Technique

In a third implementation of an invention embodiment, S230 includes generating an outlier-reduced second receiver position estimate using the hybrid technique described in this section. Note that the term "hybrid technique" is here coined to refer to exactly the technique described herein (any similarity in name to other techniques is purely coincidental).

In the hybrid technique, the posterior residual, posterior residual covariance, and posterior residual variance are calculated as in the scaled residual technique. Then, the posterior residual variances are examined. If one or more posterior residual variances is above a threshold (note: this can be a different threshold than the one mentioned in the variance threshold technique), S230 includes detecting outliers using the variance threshold technique; however, if not, S230 includes detecting outliers using the scaled residual technique. Additionally or alternatively, S230 may include selecting between the variance threshold and scaled residual techniques in any manner based on the number of above-threshold posterior residual variances and/or their magnitude.

The second receiver position state is then generated from the reduced set of observations as described previously.

All three of these techniques preferably treat phase ambiguity as a continuous variable; however, S230 may additionally or alternatively attempt to constrain phase ambiguity to an integer. For example, S230 may include (e.g., after calculating a second position estimate) calculating phase measurement residuals and comparing those residuals to integer multiples of full phase cycles (e.g., $2\pi n$). If the residual is close, this may be indicative of a cycle slip, rather than an erroneous observation.

In one implementation of an invention embodiment, S230 includes detecting a potential cycle slip, verifying that the value of the cycle slip can be chosen reliably (e.g., by verifying that only a single integer cycle slip value is contained within a known window of variance around the value of the residual), and testing the cycle slip value against the residual (e.g., by verifying that the cycle slip value is within a window of variance of the residual value). Note that the two windows of variance described here may be distinct (e.g., one may be smaller than the other). S230 may then include correcting for the cycle slip.

Note that if the method 200 identifies data from one or more sources (e.g., satellites, base stations) as erroneous, the method 200 may include flagging or otherwise providing notification that said sources may be "unhealthy". Further, the method 200 may disregard or weight differently observations from these sources.

The method 200 is preferably implemented by the system 100 but may additionally or alternatively be implemented by any system for processing of satellite position data.

The methods of the preferred embodiment and variations thereof can be embodied and/or implemented at least in part as a machine configured to receive a computer-readable medium storing computer-readable instructions. The instructions are preferably executed by computer-executable components preferably integrated with a system for outlier-reduced processing of satellite position data. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for reduced-outlier satellite positioning of a Global Navigation Satellite System (GNSS) receiver comprising:
   receiving a set of satellite positioning observations at the GNSS receiver;
   generating a first receiver position estimate from the set of satellite positioning observations;
   generating a set of posterior observation residual values from the set of satellite positioning observations and the first receiver position estimate;
   based on the set of posterior observation residual values, identifying a subset of the satellite positioning observations as statistical outliers using a hybrid technique;
   mitigating an effect of the statistical outliers; and
   after mitigating the effect of the statistical outliers, generating a second receiver position estimate having higher accuracy than the first receiver position estimate, wherein the higher accuracy is a result of mitigating the effect of the statistical outliers.

2. The method of claim 1, wherein identifying the subset of the satellite positioning observations as statistical outliers comprises using the hybrid technique; wherein using the hybrid technique comprises:
   generating a set of posterior observation residual covariances from the set of posterior observation residual values;
   calculating a set of posterior observation residual variances from the set of posterior observation residual covariances; and
   detecting outliers using a variance threshold technique when a number of posterior observation residual variances outside of a threshold range is greater than a threshold number and using a scaled residual technique when the number of posterior observation residual variances outside of the threshold range is less than or equal to the threshold number.

3. The method of claim 2, wherein the threshold range is centered on a mean of the set of posterior observation residual values; wherein a size of the threshold range is set based on a distribution of the set of posterior observation residual values.

4. The method of claim 2, wherein mitigating the effect of the statistical outliers comprises removing the statistical outliers from the set of satellite positioning observations to create a reduced-outlier set of satellite positioning observations, and generating the second receiver position estimate from the reduced-outlier set of satellite positioning observations.

5. A method for reduced-outlier satellite positioning of a Global Navigation Satellite System (GNSS) receiver comprising:

receiving a set of satellite positioning observations at the GNSS receiver;

generating a first receiver position estimate from the set of satellite positioning observations;

generating a set of posterior observation residual values from the set of satellite positioning observations and the first receiver position estimate;

based on the set of posterior observation residual values, identifying a subset of the satellite positioning observations as statistical outliers;

generating a set of posterior observation residual covariances from the set of posterior observation residual values;

calculating a set of posterior observation residual variances from the set of posterior observation residual covariances; and detecting the statistical outliers using a variance threshold technique when a number of posterior observation residual variances outside of a threshold range is greater than a threshold number and using a scaled residual technique when the number of posterior observation residual variances outside of the threshold range is less than or equal to the threshold number;

mitigating an effect of the statistical outliers; and generating a second receiver position estimate, wherein the second receiver position estimate has a higher accuracy than the first receiver position estimate, wherein the higher accuracy is based on mitigating the effect of the statistical outliers.

\* \* \* \* \*